United States Patent [19]

Sari

[11] Patent Number: 4,559,635

[45] Date of Patent: Dec. 17, 1985

[54] AUTO-ADAPTIVE AMPLITUDE-EQUALIZING ARRANGEMENT FOR DIGITAL RADIO LINKS

[75] Inventor: Hikmet Sari, Créteil, France

[73] Assignee: U.S. Philips Corporation, New York, N.Y.

[21] Appl. No.: 578,251

[22] Filed: Feb. 7, 1984

[30] Foreign Application Priority Data

Feb. 7, 1983 [FR] France ............................... 83 01867

[51] Int. Cl.[4] .............................................. H03H 7/03
[52] U.S. Cl. ........................................ 375/14; 375/16; 333/18
[58] Field of Search .............. 375/12, 14, 16; 333/18; 455/249, 304, 311; 328/155; 178/69 M

[56] References Cited

U.S. PATENT DOCUMENTS

| | | | |
|---|---|---|---|
| 4,003,006 | 1/1977 | Mandeville et al. | 333/18 |
| 4,052,671 | 10/1977 | Lange | 333/18 |
| 4,283,693 | 8/1981 | Saenz | 333/18 |
| 4,325,068 | 4/1982 | Mercer | 455/304 |
| 4,344,176 | 8/1982 | Qureshi | 333/18 |

Primary Examiner—Benedict V. Safourek
Attorney, Agent, or Firm—Thomas A. Briody; William J. Streeter; Leroy Eason

[57] ABSTRACT

An auto-adaptive amplitude-equalizing arrangement for digital radio links having an intermediate-frequency signal input, a transversal filter and a circuit for the control of the filter. The transversal filter comprises a delay circuit providing, with respect to the intermediate-frequency signal input, a delay T equal to $(2k-1)/4F_c$, where k is a positive integer and $F_c$ the center frequency of the intermediate-frequency signal, a first and a second multiplication circuit whose inputs are respectively connected to the output of the delay circuit and to the intermediate-frequency signal input, and an adder connected to the outputs of the multiplication circuits. The first multiplication circuit may be an analog amplifier whose gain is controlled by the control circuit, or may comprise a fixed-gain amplifier and a digitally controlled attenuator, the control inputs of the attenuator being connected to the count outputs of an up/down-counter, which is controlled by a zero comparator connected to the output of the control circuit.

4 Claims, 5 Drawing Figures linear phase for all frequencies, the equalizing arrangement according to the configuration proposed above in two different embodiments has no constant group delay time. The expression for this group delay time $D(\omega)$ is in fact an equation of the form:

$$D(\omega) = \frac{bT(b + a\cos\omega T)}{a^2 + b^2 + 2ab\cos\omega T}$$

where a and b are the multiplication coefficients of the transversal filter and T, the delay applied to the input signal of that filter, and an abrupt variation of $D(\omega)$ is observed in the neighborhood of frequencies such that $\omega = \pi(2k-1)/T$, k being a positive integer (see FIG. 3, which shows the curve for the variation of $D(\omega)$ as a continuous line and the same curve—rectilinear—as a line of dashes in the case of the transversal filter of the equalizer described in the article previously referred to). However, with the exception of the narrow bands centred on such frequencies corresponding to $\omega = \pi/T$, $\omega = 3\pi/T$, etc., the group delay time is practically constant. Bearing this observation in mind, and also the fact that the shape of the curve (see FIG. 4) representing the power transfer function of the arrangement according to the invention (given by an expression of the form $|H(\omega)^2| = a^2 + b^2 + 2ab\cos\omega T$) is very close to that representing the power transfer function associated with the equalizer described in the article referred to, if the frequency of the carrier coincides with one of the pivoting points $P_1$, $P_2$, etc. of $|H(\omega)|^2$ corresponding to frequencies such that $\omega = \pi(2k-1)/2T$ (k being a positive integer), then the adaptive equalizing arrangement in FIG. 1 or FIG. 2 does not change the phase response of the channel (the sudden variations in group delay time are kept out of the band used, the more so as the carrier is closer to such pivoting points, i.e. more or less at an equal distance from the narrow bands in which these variations occur), and can with advantage replace the equalizer described in the article referred to, since its structure is simpler.

Needless to say, the present invention is not limited to the embodiments which have been described, and on the basis of which other variants can be proposed without thereby exceeding the framework of the invention. In particular, the arrangement according to the invention may incorporate a further control circuit for the transversal filter for the purpose of automatic gain control. This control circuit, shown in FIG. 5, is also located at the output of adder 50 of the transversal filter and comprises, arranged in series, a rectifier 230 and an integrator 250 whose output signal is applied to the second multiplication circuit 40. Circuit 40 may be an analog variable-gain amplifier whose automatic gain-control signal is then formed by the output signal from integrator 250; circuit 40 may also, as circuit 30 in FIG. 2, consist of a series circuit comprising a fixed gain amplifier and a digitally controlled attenuator, which is controlled by the output of integrator 250 with the aid of a zero comparator and an up/down-counter (receiving clock signals of the same kind as described above).

What is claimed is:

1. In an auto-adaptive amplitude-equalizing arrangement for digital radio links comprising, connected in series, an intermediate-frequency signal input terminal, a transversal filter connected to such input terminal for correcting amplitude distortions of the input signal, and a control circuit for controlling the transversal filter; the control circuit comprising two frequency-selective detectors connected in parallel and respectively centered on two frequencies which are symmetrical with respect to the center frequency of the received intermediate-frequency signal, and a difference amplifier having its input connected to the outputs of the two detectors for supplying to the transversal filter an output signal representing the difference between the output signals of the two detectors; the improvement wherein the transversal filter comprises: a delay circuit connected to the signal input terminal of said arrangement for providing, with respect to the intermediate-frequency signal input, a delay T equal to $(2k-1)/4F_c$, where k is a positive integer and $F_c$ the center frequency of the intermediate-frequency signal; a first and a second multiplication circuit whose inputs are respectively connected to the output of said delay circuit and to the intermediate-frequency signal output; and an adder connected to the outputs of the first and second multiplication circuits for applying the sum of the signals produced thereby to the input of each of the detectors of the control circuit; the first multiplication circuit being a variable gain amplifying circuit, automatic control of the gain thereof being effected by the output signal of the difference amplifier of the control circuit.

2. An arrangement as claimed in claim 1, wherein the first multiplication circuit comprises a fixed-gain amplifier and a digitally controlled attenuator connected in series, the output of the attenuator being the output of the first multiplication circuit; the control inputs of said attenuator being connected to respective count outputs of an up/down-counter; the up-down counter being controlled by a zero comparator connected to the output of the difference amplifier of the control circuit.

3. An arrangement as claimed in claim 1 further comprising, connected to the output of the adder of the transversal filter, a further control circuit comprising a rectifier and an intergrator in series; the output signal of the integrator being applied as an automatic gain-control signal to the variable gain amplifier of the second multiplication circuit.

4. An arrangement as claimed in claim 1, wherein the second multiplication circuit comprises a variable gain amplifier the gain of which is automatically controlled by the output signal of the adder of the transversal filter.

* * * * *

AUTO-ADAPTIVE AMPLITUDE-EQUALIZING ARRANGEMENT FOR DIGITAL RADIO LINKS

BACKGROUND OF THE INVENTION

The present invention relates to an auto-adaptive amplitude-equalizing arrangement for digital radio links.

In digital radio links, which are very sensitive to selective fading, intermediate-frequency amplitude-equalization considerably improves performance, particularly if the selective fading does not occur in the band of the transmitted signal, by permitting, notably, a more robust regeneration of the carrier and providing a widening of the eye-opening of the demodulated signal. An equalizer achieving these objectives is described in the article, "Egaliseur autoadaptatif d'amplitude pur faisceaux hertziens numériques", by P. Gérard, Revue Technique Thomson-CSF, Volume 13, No. 1, March 1981, pp. 135-158.

It is an object of the invention to propose an equalizer having comparable performance, but being simpler than that described in the above-mentioned article.

SUMMARY OF THE INVENTION

According to the invention, there is provided an auto-adaptative amplitude-equalizing arrangement for digital radio links comprising, in series, an intermediate-frequency signal input, a transversal filter for correcting amplitude distortions of the input signal, and a control circuit for controlling the transversal filter, the control circuit consisting of two frequency-selective detectors connected in parallel and respectively centred on two frequencies which are symmetrical with respect to the centre frequency of the received intermediate-frequency signal, and of an amplifier for supplying a signal representing the difference between the output signals of the two frequency-selective detectors to the transversal filter. The arrangement is characterized in that the transversal filter, having two stages, comprises a delay circuit providing, with respect to the intermediate-frequency signal input, a delay T equal to $(2k-1)/4F_c$, where k is a positive integer and $F_c$ the centre frequency of the intermediate-frequency signal. The two types respectively comprise a first and a second multiplication circuit whose inputs are respectively connected to the output of the delay circuit and to the intermediate-frequency signal input, and an adder connected to the outputs of the first and second multiplication circuits, the first multiplication circuit being an amplifying circuit whose gain is automatically controlled by the output signal of the amplifier of the control circuit.

According to a variant of the invention, the first multiplication circuit comprises the series connection of a first fixed-gain amplifier and a first digitally controlled attenuator, the control inputs of this attenuator being connected to count outputs of a first up/down-counter, which is controlled by a zero comparator connected to the output of the amplifier of the control circuit.

Features of the invention will be more fully appreciated from the following description of exemplary embodiments when considered in conjunction with the accompanying drawings.

DESCRIPTION OF THE PREFERRED EMBODIMENTS

Figure 1:
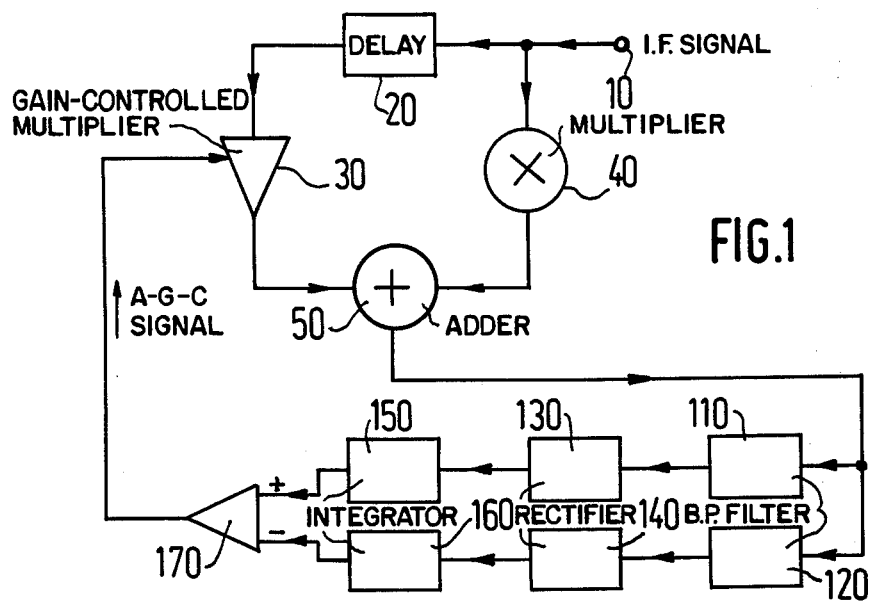
FIGS. 1 and 2 show two embodiments of the equalizing arrangement according to the invention.

The amplitude-equalizing arrangement shown in FIG. 1 is of the two-stage transversal-filter type and comprises an intermediate-frequency signal input 10, a transveral filter for the correction of the amplitude distortions of the input signal, and a control circuit for controlling this transversal filter. The filter consists of a delay circuit 20 providing a delay T equal to $(2k-1)/4F_c$, where k is a positive integer and $F_c$ the centre frequency of the intermediate-frequency signal, and of two multiplication circuits 30 and 40 whose inputs are respectively connected to the output of delay circuit 20 and to signal input 10 and whose outputs are connected to the two inputs of an adder 50. The control of the transversal filter is effected with the aid of a control circuit comprising two frequency-selective detectors connected in parallel and respectively centred on two frequencies symmetrical with respect to the centre frequency of the received signal. More in detail, the control circuit comprises two bandpass filters 110 and 120 having a narrow bandwidth and being respectively centred on two frequencies $F_1$ and $F_2$ which are symmetrical with respect to the centre frequency $F_C$ of the intermediate-frequency signal. Filters 110 and 120, connected to the output of adder 50 and in two distinct parallel channels, are followed, in series and respectively, by two rectifiers 130 and 140 and two integrators 150 and 160 at whose output the power of the signal in each of the two bands centred on $F_1$ and $F_2$ is available. The outputs of the integrators 150, 160 are applied to the respective inputs of a difference amplifier 170, which detects the power difference between the said two frequency bands and whose output signal is applied as automatic gain-control signal to the first multiplication circuit 30, which is constituted by an analog variable-gain amplifier.

Figure 2:
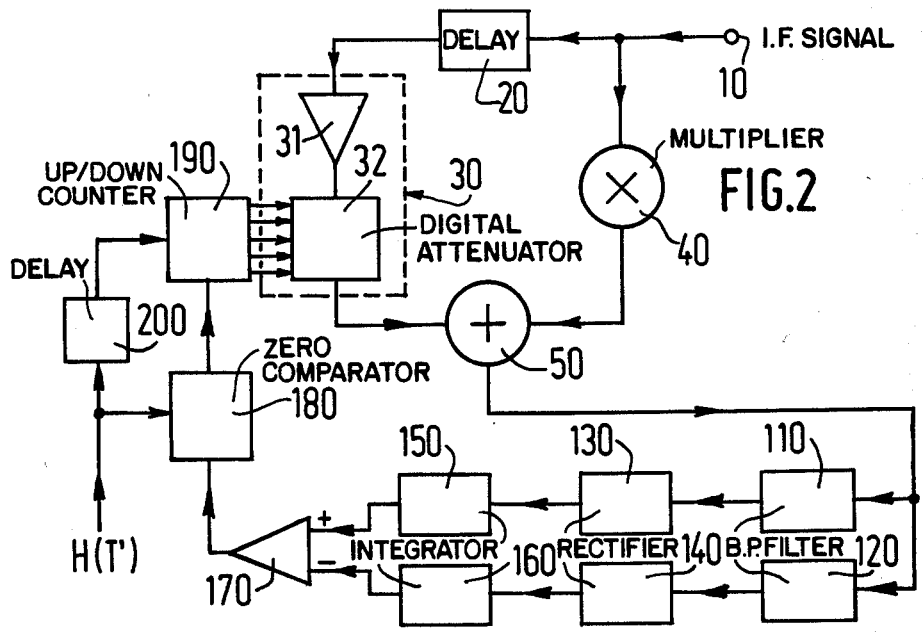
Figure 3:
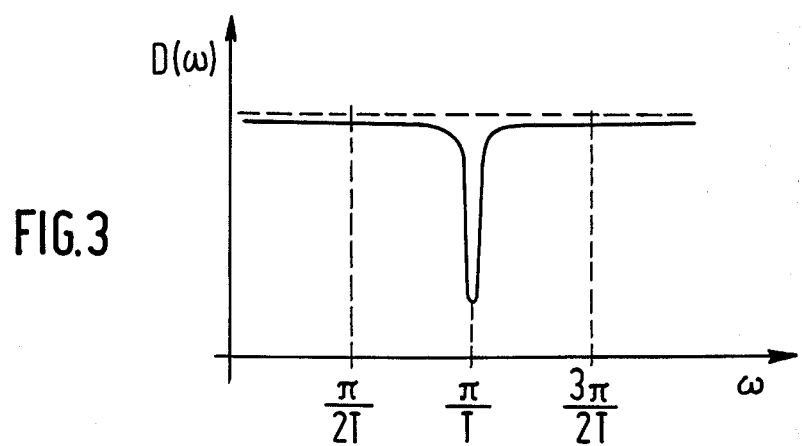
FIGS. 3 and 4 respectively show the curve of the group delay time and the curve of the power transfer function of the equalizing arrangement according to the invention.
Figure 4:
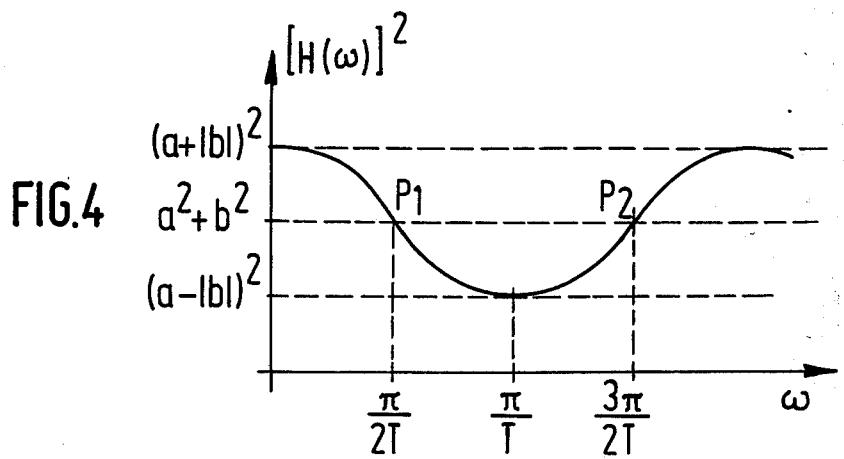
Figure 5:
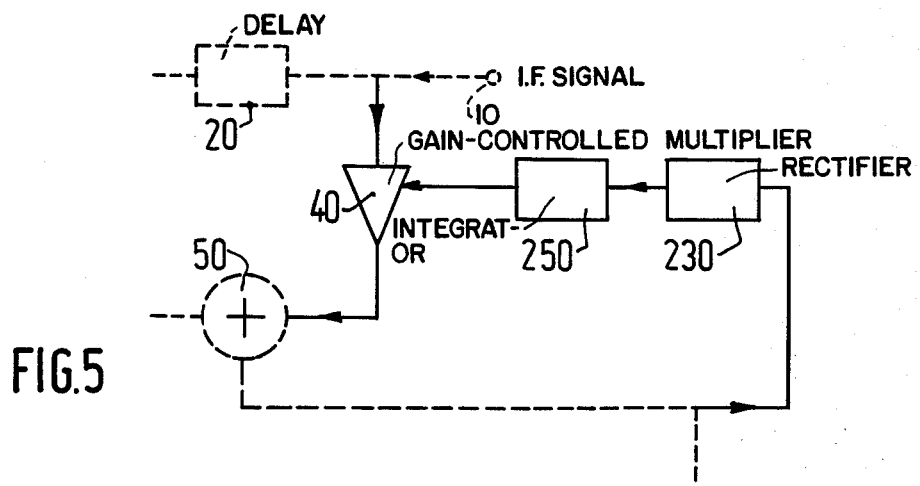
FIG. 5 shows a complementary control device which can be incorporated in the equalizing arrangement according to the invention.

In a second embodiment of the arrangement according to the invention, shown in FIG. 2, the first gain-controlled multiplication circuit is no longer a simple variable-gain amplifier but now consists of a series circuit comprising a fixed-gain amplifier 31 and a digitally controlled attenuator 32, whose control inputs are connected to respective count outputs of an up/down-counter 190 which is itself controlled by a zero comparator 180 connected to the output of difference amplifier 170. The Comparator 180 receives a clock signal H (T') at a rate defined by the period T' (this rate may be modified, if necessary, in accordance with the increased or decreased speed of the channel variations in order to follow the latter better), and up/down-counter 190 receives the same clock signal but delayed in a delay circuit 200 to take account of the settling time of the comparator.

Unlike the equalizer described in the article referred to above which comprises a transversal filter having a